R. SCHWALBACH.
SHOE TIP PERFORATOR.
APPLICATION FILED MAY 21, 1918.

1,313,956.

Patented Aug. 26, 1919.
5 SHEETS—SHEET 1.

WITNESSES:

INVENTOR
Robert Schwalbach
BY
ATTORNEY

R. SCHWALBACH.
SHOE TIP PERFORATOR.
APPLICATION FILED MAY 21, 1918.

1,313,956.

Patented Aug. 26, 1919.
5 SHEETS—SHEET 2.

Fig. 2.

WITNESSES:

INVENTOR
Robert Schwalbach
BY
ATTORNEY

R. SCHWALBACH.
SHOE TIP PERFORATOR.
APPLICATION FILED MAY 21, 1918.

1,313,956.

Patented Aug. 26, 1919
5 SHEETS—SHEET 5.

WITNESSES:

INVENTOR
Robert Schwalbach
BY
ATTORNEY

UNITED STATES PATENT OFFICE.

ROBERT SCHWALBACH, OF MILWAUKEE, WISCONSIN, ASSIGNOR OF ONE-HALF TO ROBERT W. BLAISDELL, OF MILWAUKEE, WISCONSIN.

SHOE-TIP PERFORATOR.

1,313,956.　　　　　　　Specification of Letters Patent.　　Patented Aug. 26, 1919.

Application filed May 21, 1918. Serial No. 235,872.

*To all whom it may concern:*

Be it known that I, ROBERT SCHWALBACH, a citizen of the United States, and resident of Milwaukee, in the county of Milwaukee and State of Wisconsin, have invented certain new and useful Improvements in Shoe-Tip Perforators; and I do hereby declare that the following is a full, clear, and exact description thereof.

My invention relates broadly to improvements in machines for perforating sheets of material, and more particularly to that class of machines which are designed for perforating shoe tips and similar pieces of leather.

Heretofore in machines of this general class it has been necessary to more or less disassemble the same when it is desired to make a change in the pattern of the dies used for cutting or perforating the material. This required a considerable length of time and obviously the machine was entirely inoperative during the change. It is therefore the principal object of the present invention to provide in connection with a machine of improved design a plurality of patterns of dies, any one of which can be quickly and easily shifted into operative position so that the machine is only momentarily inactive.

A further object is to provide such a machine with an intermittently actuated perforating mechanism in combination with the plurality of die patterns. In other words after each actuation of the machine to perforate the shoe tip or the like, the operating mechanism therefor is automatically thrown out of action and remains so until manually caused to again function. Such an arrangement permits the association of a safety device which will positively prevent the manual operation referred to from being performed if none of the several perforating dies are properly set.

An additional object of the invention is to provide means for intermittently actuating a backing sheet, such intermittent movement of the same being caused by the operation of the perforating mechanism.

Another object is to provide a safety guard adjacent the inlet of the passage-way to the perforating dies so that an operator cannot insert his fingers into engagement with said dies.

And a still further important object is to provide in connection with each of the several perforating dies a positioning member whereby the shoe tips or the like will be accurately positioned with respect to the dies which are to operate thereupon.

With the foregoing and other minor objects in view the invention resides in the novel features of construction, combination and arrangement of parts which will be hereinafter more particularly described and claimed and shown in the drawings in which:

Fig. 3 is an enlarged sectional view through the perforating mechanism of the machine on the line 3—3 of Fig. 4.

Figure 1:
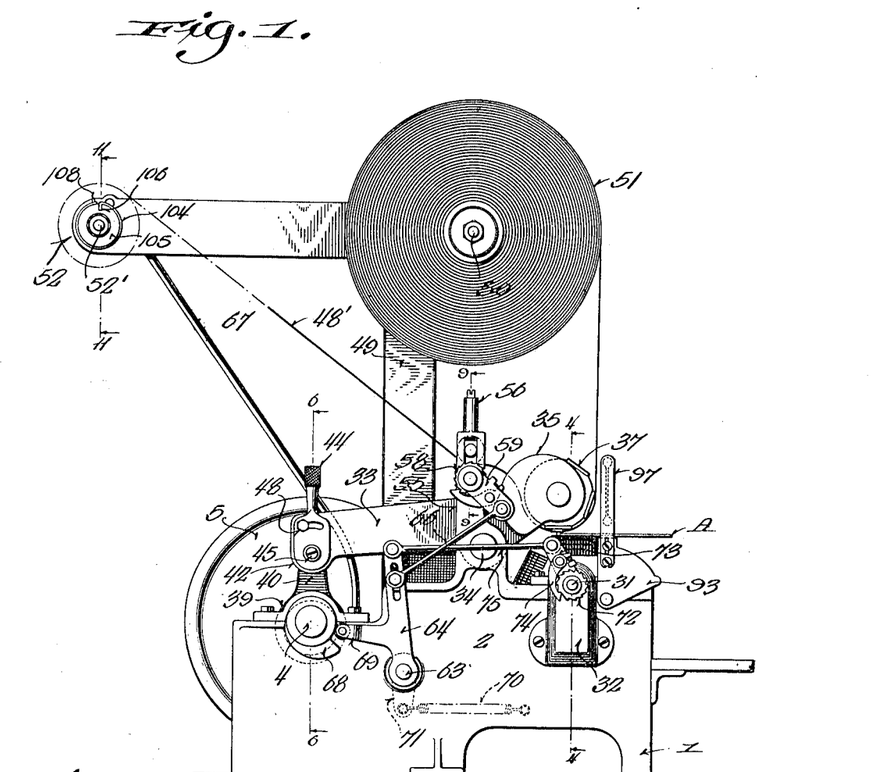
Figure 1 represents a left hand elevational view of a machine constructed in accordance with my invention.
Figure 2:
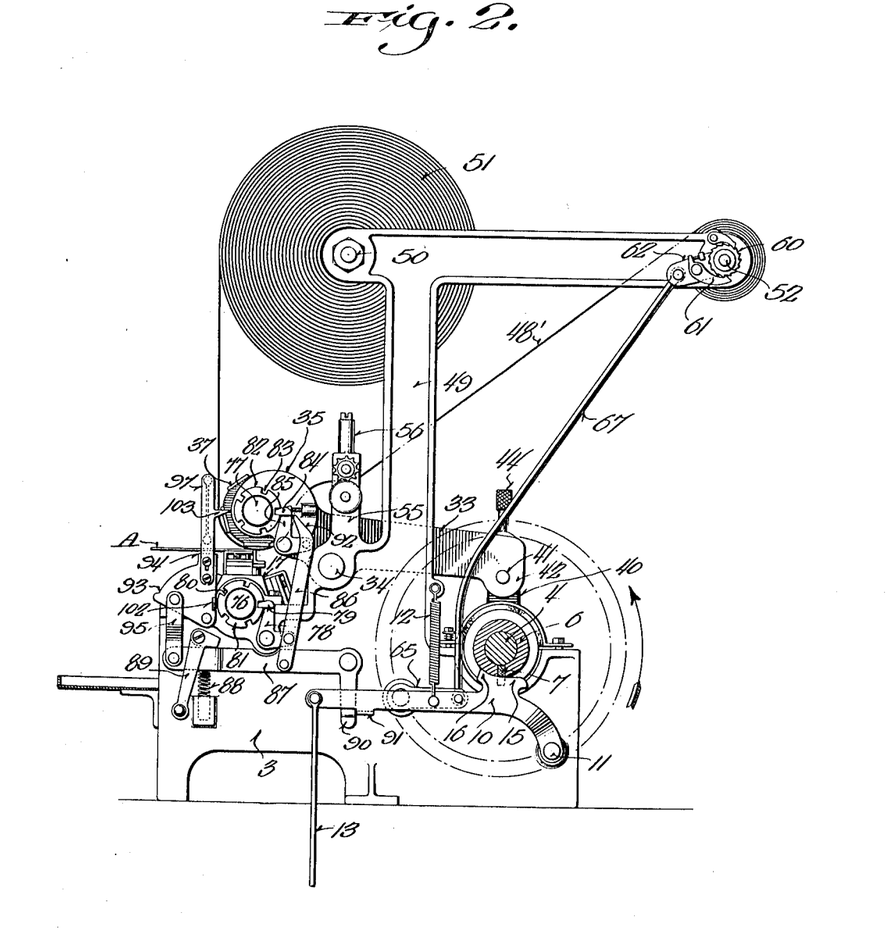
Fig. 2 is a similar view looking toward the right hand side of the machine, certain parts, however, being in section as indicated by the line 2—2 of Fig. 6.
Figure 4:
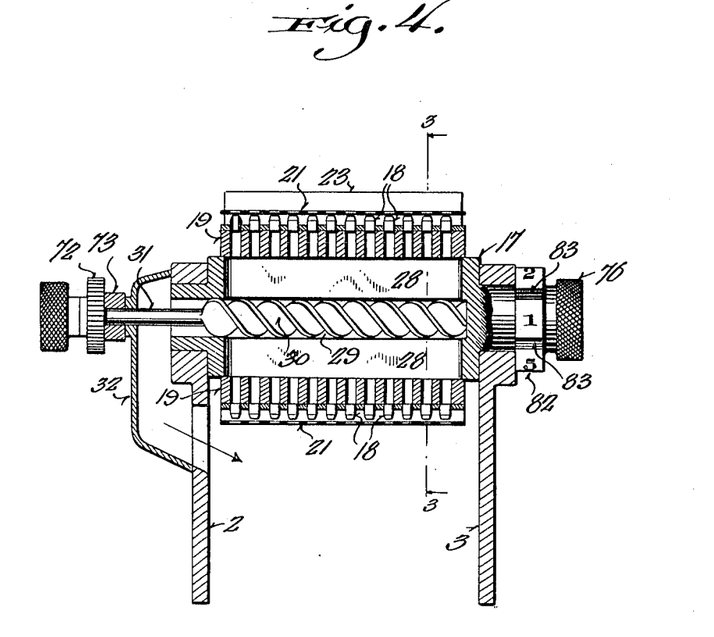
Fig. 4 is a longitudinal sectional view taken substantially on the plane of the line 4—4 of Fig. 1 or on the same line of Fig. 3.
Figure 5:
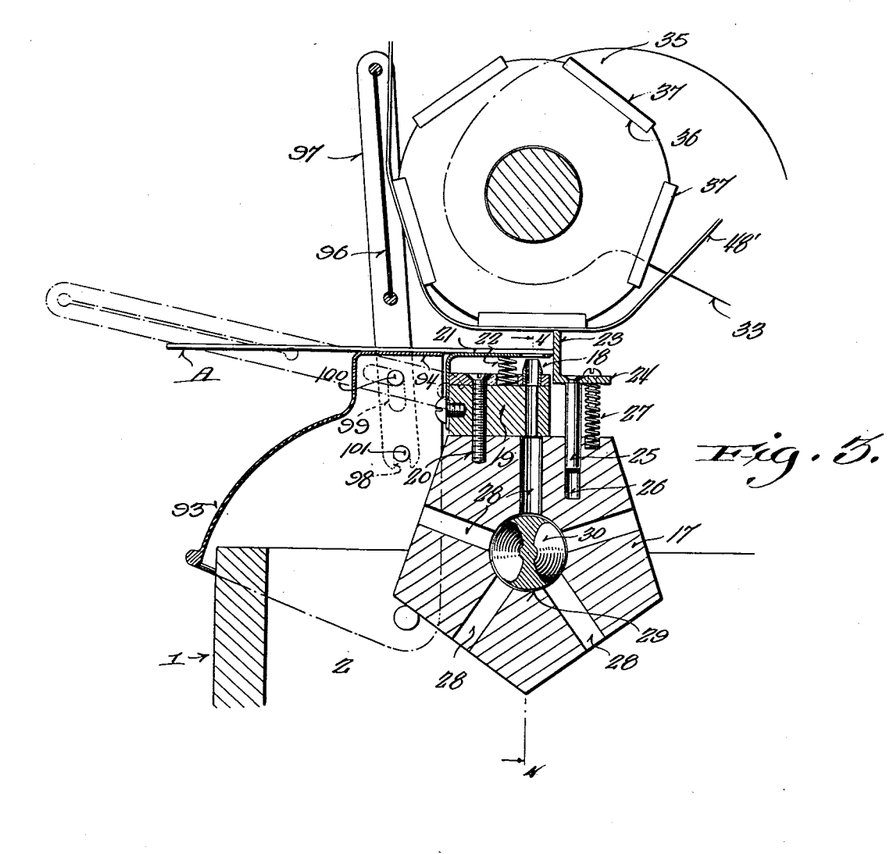
Fig. 5 is a detail plan view, partly in section, showing one of the patterns of perforating dies and the association of a positioning member therewith.

Referring more particularly to the several figures of the drawings, but more specially to Figs. 1 and 2, it will be seen that the numeral 1 denotes a supporting base which is substantially rectangular in plan view and has left and right hand upright side walls 2 and 3 respectively upon which the majority of the operating mechanism is mounted. Referring to the several parts of such mechanism in detail, it will be noted that a main shaft 4 has its opposite ends journaled in the walls 2 and 3 adjacent the rear end of the base, and that one end of this shaft projects beyond the wall 3 and carries a continuously rotating pulley 5 and a clutch mechanism for intermittently connecting the latter thereto.

This clutch device comprises a sleeve 6 splined to the shaft 4 and having a longitudinal key-way cut therein for the reception of a sliding clutch member 7. This clutch member is urged outwardly and toward clutch pins 8 carried by the pulley by means of an expansile spring 9. It is obvious that as long as the clutch members 7 and 8 coöperate that the shaft and pulley will rotate together.

It is desirable, however, in machines of this character to automatically release the clutch at predetermined intervals, as for instance after each complete revolution of the shaft. For performing this operation I provide a clutch operating lever 10 pivoted as at 11 to the wall 3 below the shaft 4, said lever being urged toward the shaft by means of a contracting coiled spring 12. A rod 13 is pivoted to the forward end of the lever 10 and is adapted to extend downwardly to a foot pedal or the like (not shown) whereby the said lever may be forced downwardly against the tension of said spring 12. Formed on the clutch lever 10 in a position to engage in a notch 14 cut in the outer edge of the sliding clutch member 7, is a clutch releasing bar 15, the front end of which is beveled as at 16 so as to engage the notch 14 when the clutch member 7 is in its outermost position and locked with one of the clutch pins 8, thus gradually forcing the former inwardly against the tension of the spring 9 until the clutch is inoperative. When the clutch operating lever 10 is moved downwardly the releasing bar 15 will be disengaged with the notch 14 and the sliding clutch member 7 will spring outwardly into a position to be engaged by one of the clutch pins 8.

Journaled in the walls 2 and 3 of the supporting base at the front end thereof and parallel to the shaft 4 is a revoluble perforating die carrying member 17 which is in the form of a poly-sided roller, each flat face thereof having a set of perforating dies and associated parts, each of the sets of dies being of a different pattern.

Referring to Fig. 3, the cutting dies of each set are indicated by the numeral 18 and are carried by a block 19 which in turn is fixed by screws or the like 20 to the member 17. Over each set of dies is disposed a flexible guide plate 21 which has a laterally extending attaching portion whereby it is secured to the block 19; it also has a plurality of openings through which the dies 18 project during the actual perforation of a shoe tip or other sheet of material A. The guide plate 21 of the set of dies which is in operative position, is disposed substantially horizontally and is held thusly by an expansile spring 22, said spring being between the plate and the block 19.

Disposed at the inner edge of each guide plate 21 and thus spaced inwardly of each seat of perforating dies 18 is an arcuate positioning flange 23, the same having a laterally extending portion 24 to which is secured a number of guide pins 25, the latter being slidable in sockets 26 drilled in the member 17. The positioning flanges 23 are normally forced outwardly by expansile coiled springs 27 which are held between the laterally extending portions 24 and the adjacent face of the die carrying member 17. It will thus be seen that each of the positioning flanges 23 coöperates with the adjacent guide plate 21, the latter forming a seat for the inner portion of the shoe tip A while the latter provides a stop to limit inward movement of the same.

All of the dies 18 forming the several sets are tubular as indicated in the last mentioned figure and the inner end of each communicates with a radial passage-way 28 in the member 17, the several radial passageways in turn opening into a preferably cylindrical longitudinal passage-way 29. The last mentioned passage-way is open at one end for the insertion of a screw conveyer 30, the shaft 31 of which projects through the wall 2 of the supporting base and is connected with suitable operating mechanism to be hereinafter more particularly described. As a result of this construction the punchings drop into the longitudinal passage-way 29 and are conveyed externally of the die carrying member 17 and directed through a pocket 32 secured to the wall 2 and thence into the base 1.

A main operating lever 33 is fulcrumed intermediate its ends on laterally extending trunnions 34 which are journaled in the walls 2 and 3 of the base midway the shaft 4 and die carrying member 17. The forward end of the lever 33 is bifurcated to form a pair of ears 35 between which a die plate carrying member is rotatably mounted, said member being in the nature of a roller having its periphery recessed at a plurality of spaced points as at 36. In each of the recesses 36 is secured a die engaging plate 37, one of the plates being adapted to coöperate with each set of dies 18. In other words the plates 37, which are of some soft metal such as copper or brass, are equal in number to the sets of dies.

When in proper position, the plate 37 which is to coöperate with the uppermost set of dies is positioned horizontally so that when it is moved toward the latter by the rocking of the lever 33, the axis of the dies will be at right angles to the plane of the engaging face of the plate. And when this movement takes place the adjacent positioning flange 23 will be first engaged and forced inwardly and then when the guide plate 21 is reached it will be similarly moved against the tension of the springs 22 so as to force the dies 18 through the opening therein and through the shoe tip A to thus perforate the latter. On the outward movement of the lever 33 the positioning flange and the guide plate will return to their normal extended positions and the prepared shoe tip is removed to make way for a second unperforated tip.

Taking up now the means for rocking the lever 33 it will be observed that the portion of the shaft 4 between the walls 2 and 3 is provided with an eccentric 38, an eccentric strap 39 being disposed therearound and connected with the rear end of the lever 33 by an eccentric arm 40. As the shaft rotates the lever 33 will be rocked to intermittently move the plate carrying member and the plates 37 carried thereby toward the dies.

Means is also provided in connection with the association of the eccentric with the lever 33 for varying the pressure with which the horizontally disposed plate 37 engages this coöperating set of dies. This includes a pin 41, the opposite ends of which are journaled in the flanges 42 of the bifurcated rear end of the lever 33, having an eccentric cam 43 formed intermediate its ends and positioned between said flanges 42. The upper end of the eccentric arm 40 has a bearing opening to receive the eccentric cam 43; as the pin 40 is rotated the rear end of the lever 33 will be raised or lowered with respect to the arm 40 with a consequent reverse movement at the front end of said lever.

Figures 6, 7, 8, 9, 10:
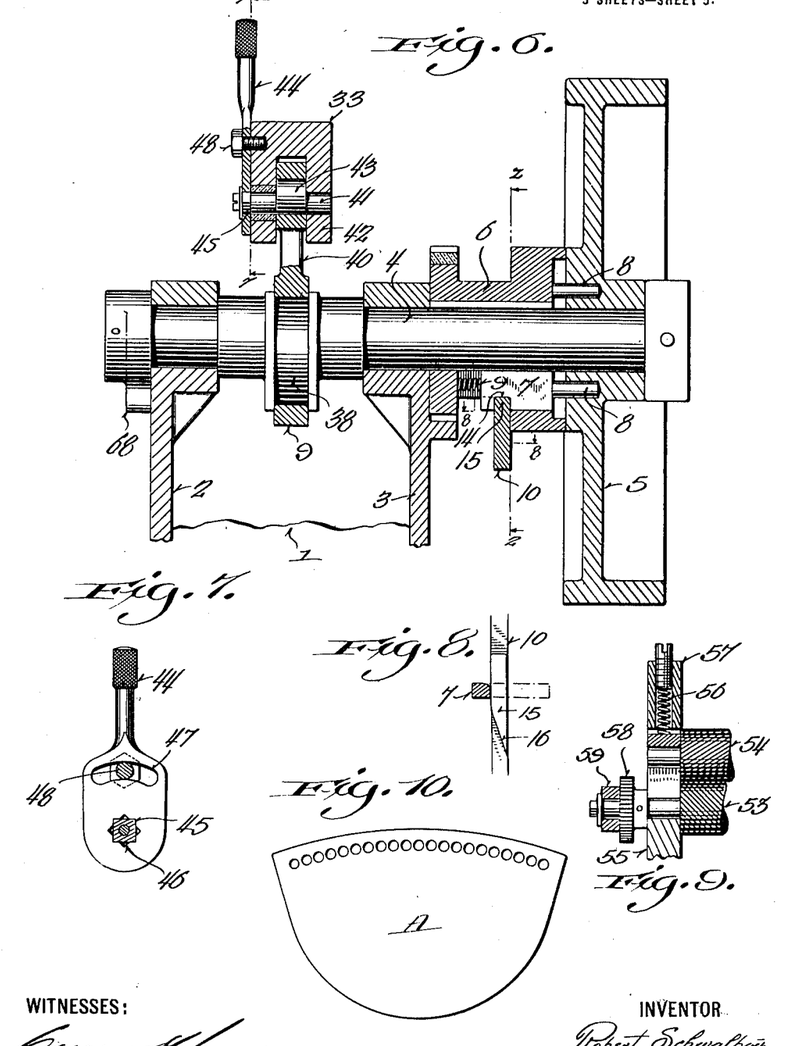
Fig. 6 is a sectional view taken substantially on the plane of the line 6—6 of Fig. 1.
Fig. 7 is a detail section on the plane of the line 7—7 of Fig. 6.
Fig. 8 is a similar view on the line 8—8 of Fig. 6.
Fig. 9 is an enlarged detail section on the line 9—9 of Fig. 1.
Fig. 10 is a plan view of a shoe tip after the same has been perforated by my machine.

The pin 41 is rocked by a crank arm 44 with which it is adjustably connected. From Figs. 6 and 7 it will be seen that one end of the pin 41 is squared as at 45 for engagement with a star opening 46 in the crank arm 44. The intermediate portion of the crank arm is provided with an arcuate slot 47 through which a bolt 48 extends into the lever 33, the head of said bolt retaining both the pin 41 and the crank arm 44 in position. By shifting the crank arm 44 on the bolt 48, a considerable rocking of the pin 41 is permitted, but if an additional amount of pressure is to be exerted by the forward end of the lever 33, the crank arm 44 is entirely removed and readjusted on the squared end of said pin.

In perforating leather or similar material it is customary to provide a backing sheet 48' of heavy paper or light flexible card-board between the material to be perforated and the die plate 37, this being desirable to procure sharply cut perforations. Inasmuch as the perforating mechanism of the present machine is only intermittently actuated and may be out of operation for considerable period of time, I preferably feed the backing sheet 48' over the die plate intermittently, such movement being controlled by the perforating mechanism. In carrying out this feature of the invention, the side walls 2 and 3 are each provided with an upwardly extending L bracket 49 at the intersection of the arms of each of which is journaled one end of the shaft 50 of a backing sheet roll 51; the free ends of the horizontal arms of said brackets journally carry a roller 52 on which the backing sheet is wound after passing between the dies and die engaging plates and a feeding mechanism.

This feeding mechanism comprises a pair of horizontally disposed serrated or roughened rollers 53 and 54, the opposite ends of which are journaled in bearing standards 55 extending upwardly from the walls 2 and 3. The rollers are superimposed and the upper one has a floating bearing and is urged toward the lower by springs 56 which are mounted in spring housings 57 formed on the upper ends of the standards 55. The shaft of the lower roller 53 has one end extended beyond its adjacent standard 55 to receive a ratchet wheel 58, which is secured thereto, and a pawl carrying lever 59 freely rotatable thereon.

In a similar manner one end of the shaft of the roller 52 is extended and has a ratchet 60 fixed thereon with the teeth of which a pawl 61 carried by a lever 62 is adapted to engage.

The rollers 52, 53 and 54 are designed to be simultaneously revolved, the latter pair for the purpose of feeding the backing sheet from the backing sheet roll 51, and the former to roll up the portion of the sheet thus fed. This is carried out by a rock shaft 63, journaled in the base 1, and having crank levers 64 and 65 fixed on its opposite ends, a connecting rod 66 extending from the crank lever 64 to the lever 59, and a second connecting rod 67 pivoted to the crank lever 65 and lever 62. The rock shaft 63 is actuated to move the lever 64 forwardly and the lever 65 upwardly by the engagement of a cam 68 on the shaft 4 with one end of the cam arm 69 which extends from the first mentioned lever 64. Such forward and upward movement of the respective levers effects the rotation of the levers 59 and 62 respectively in the proper directions to cause the pawls carried thereby to engage and rotate the ratchets. After the cam 68 has moved out of engagement with the cam arm 69 by the continued rotation of the shaft 4, a contractile spring 70 having one end fixed to the base 1 and the other to a crank 71 on the rock shaft returns the levers 64 and 65 to their normal positions.

As hereinbefore mentioned the conveyer 30 is designed to be rotated to move the punchings longitudinally of the die carrying member 17, and this is effected simultaneously with the rotation of the rollers 52, 53 and 54 and by the same type of mechanism. That is to say a ratchet wheel 72 is fixed to the outer end 31 of the conveyer on which is pivoted a pawl carrying lever 73, the pawl 74 which is fulcrumed thereon being designed to coöperate with the ratchet teeth of the wheel 72. A connecting rod 75 extends from the lever 73 to the upper end of the crank lever 64.

When it is necessary to perforate shoe tips and the like with a different design or pattern of openings from those which had been previously operated upon, the die carrying member 17 is turned to dispose a different set of dies uppermost, such movement being accomplished by grasping and rotating a knob 76 on one end thereof. The plate carrying member on which the die engaging plates 37 are secured is turned in a like manner by a knob 77. First, however, it is necessary to release the locking means which normally holds both of the carrying members in stationary position. The retaining means for the member 17 consists of a bell crank 78 pivoted to the wall 3 of the supporting base 1, on one arm of which is a laterally projecting detent finger 79 for engagement in any one of a series of spaced notches 80, formed in flange 81 on the end of said carrying member 17. Each of the notches 80 correspond to one of the sets of dies and when the detent finger 79 is disposed in one of said notches, a set of dies will be properly positioned to be engaged by its corresponding plate 37.

One end of the plate carrying member is also provided with an annular flange 82 having a plurality of spaced notches 83 in its periphery with which a laterally extending detent finger 84 formed on one arm of a bell crank 85 is adapted to coöperate. These notches 83 are equal in number to the plates 37 and when the detent finger 84 is engaged in any one of the same, one of the plates will be in a horizontal operative position and ready for engagement with its corresponding set of dies.

The arms of the bell cranks 78 and 85 remote from the arms on which said detent fingers are formed are pivoted to the opposite end portions of a link 86, the lower end of which is pivoted intermediate the long arm of a bell crank lever 87, said lever being fulcrumed on the wall 3 of the base 1. Said long arm of the lever 87 is extended forwardly and is normally urged upwardly by an expansile spring 88. Above the bell crank lever 87 and adjacent the outer end of the long arm thereof is pivoted a releasing crank 89, one end of which is adapted to engage said arm when rotated in one direction whereby to rock said lever 87 downwardly to move the link 86 in the same direction; such movement of the link obviously releases the detent fingers 79 and 84 from their notches 80 and 83 respectively, thus permitting the carrying members for the dies and their plates to be freely rotated.

After adjusting said carrying members to their new positions, the crank 89 is moved into inoperative position and the spring 88 exerts its tension to rock the bell crank lever 87, and through the link 86 the bell cranks 78 and 85 are shifted to their locking position. Should one of the detent fingers be not seated in any one of its notches, the bell crank lever 87 will not return to its original or normal position. Therefore since it will be detrimental to the machine to allow the same to operate when either of the carrying members is improperly positioned, the short depending arm of the bell crank lever 87 is provided with a stop finger 90 for coöperation with a similar finger 91 on the clutch operating lever 10.

Thus when the detent finger 79 engages only the periphery of the flange 81, the stop finger 90 will be disposed below the stop finger 91 to thus prevent the downward movement of the clutch operating lever 10, which movement, it will be remembered, causes the release of the sliding member 7 of the clutch to permit its coöperation with the clutch pins 8. The stop fingers 90 and 91 are similarly positioned when the detent finger 84 is not seated in any of its notches 83, a finger 92 on the upper end of the link 86 being engaged with the laterally extending portion of said finger 84 when the first mentioned parts are so arranged; and also when the releasing crank 89 has been operated to throw the bell cranks 78 and 85 to unlocked position.

Pivoted to the walls 2 and 3 of the base 1 over the upper edge of the front wall thereof so as to cover the space between the latter wall and the die carrying member 17 is a guard hood 93, the same having a laterally extending flange 94 which, when the hood is in operative position, is horizontal and in substantially the same plane as the guide plate 21 on the uppermost set of dies. (See Fig. 3). The flange and the adjacent guard plate form a support of considerable width for the shoe tip or the like A.

Inasmuch as the inner edge of said flange 94 is in close proximity to the outer edge of its coöperating guide plate, it is necessary to move the guard hood 93 outwardly prior to the rotation of the die carrying member for the selection of a new set of dies. This is done simultaneously with the unlocking of the die and plate carrying members by pivoting one end of a link 95 to the hood at a point spaced from its pivotal connection with the wall 3, and similarly connecting the other end of said link to the forward free end of the long arm of the lever 87. The guard hood is thereby swung into and out of operative position by the movement of the releasing crank 89, but it will be noted that it is always in operative position when the perforating mechanism is functioning.

A protective means is also mounted above this guard hood 93 and in front of the plate carrying member to prevent an operator from inserting his fingers between the uppermost set of dies and the corresponding die plate, such means being in the form of a guard plate 96. This plate is normally substantially vertically disposed and is carried by a pair of leg bars 97, said leg bars each having its lower end provided with a notch or open end slot 98 and a slot 99, the latter being spaced inwardly of the former and adapted to receive a pin or bolt 100 which projects from the hood 93. The notches 98 are removably disposed over pins or bolts 101 which also project from the opposite ends of the guard hood 93. When it is necessary to remove the guard plate 96 to permit access to the plate carrying member or other adjacent parts of the machine, the same is raised vertically to disengage the notches 98 from the pins 101. The guard plate can then be moved laterally as indicated by the broken lines in Fig. 3.

The lower edge of the guard plate 96 is spaced above the flange 94 only a sufficient distance to permit a shoe tip or the like to be inserted into the machine and properly adjusted with respect to the perforating dies. A further advantage of this guard plate is that it holds the backing sheet 48' against the plate carrying member and consequently prevents the roll 51 from unwinding too rapidly.

Inasmuch as the guard hood 93 and guard plate 96 are both located adjacent the notched flanges 81 and 82 of the die and plate carrying members respectively, and as it is essential that the proper die engaging plate be arranged for coöperation with its corresponding set of dies, an indicator finger 102 is formed on said guard hood and a similar finger 103 projects from one of the leg bars 97 of the guard plate 96. The flanges 81 and 82 are provided with numbers or other symbols, one being used to designate each of the sets of dies and its corresponding plate 37. Thus when the indicator fingers 102 and 103 point toward the same symbols on the two flanges 81 and 82, the operator will know that the proper set of dies is adapted to coöperate with the horizontally positioned die engaging plate 37.

The roller 52 on which the backing sheet 48' is automatically wound after passing through the machine is of improved design and comprises an outer sheet metal skeleton roll or shell 104 and a body or filler 105 disposed in the former and having a longitudinal central bore through which the roller shaft 52' extends. The shell 104 is split longitudinally and has one edge bent inwardly to form a longitudinal lip 106, which lip is disposed in a longitudinal groove 107 cut in the body 105; the shell can thus slide longitudinally of the body without rotation with respect thereto.

Figures 11, 12:
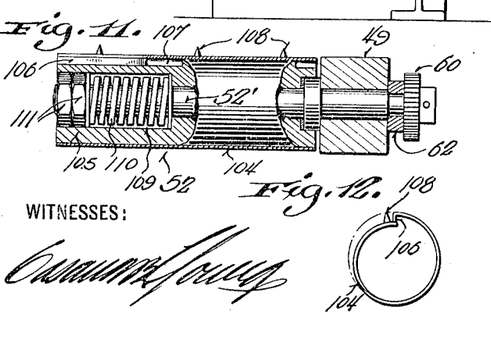
Fig. 11 is a longitudinally sectional view taken on the plane of the line 11—11 of Fig. 1.
Fig. 12 is an end view of a portion of the roller 52 and shown particularly in the preceding figure.

Spurs 108 are carried by the shell 104 and are disposed in spaced relation with the opposite longitudinal edge to that on which the lip 106 is formed. Thus when the backing sheet 48' is wound around the roller 52, the spurs 108 will engage in said sheet and prevent its slipping on the shell 104. After the roll 51 is exhausted and the complete backing sheet wound on the roller 52, the shell 104 may be slid from its body 105 to remove the used material forming the backing sheet. Owing to the fact that the shell 104 is split, it may be readily removed from this roll formed of the backing sheet by springing one edge portion beneath the lip 106 as indicated in Fig. 12, thus reducing its diameter and rendering the removal of the shell easy. Said shell may then be again placed on its body 105 for further operations.

Owing to the difference in the size of the roll of material on the roller 52 at various times, it is obvious that in order to roll up the surplus portions of the backing sheet, said roller must move a greater distance when the amount of material thereon is small than when the same is of large quantity. Therefore since the dog 61 always tends to move the ratchet 60 the same distance, I provide means for permitting slippage between the shaft 52' and the body 105. That is to say said body is provided with a cavity 109 in which is disposed an expansile spring 110, one end of said spring being engaged with the bottom of the cavity while the outer end contacts with an adjustable nut 111 on said shaft 52'. Normally the tension of the spring causes the shaft 52' and the body 105 to move in unison, but when the usual length of movement of the roller 52 is not necessary, said slippage takes place.

From the foregoing description taken in connection with the accompanying drawings it will be seen that a very simply constructed machine for accomplishing the desired objects of the invention has been produced and that the same will be very efficient in operation and use. Various minor changes may be made in the several parts of the machine without departing from or sacrificing any of the principles or advantages thereof.

I claim:—

1. A machine of the class described comprising a cutting die, a plate carrying member disposed over the die, a die engaging plate on said member, means for causing the die and plate to engage, a backing sheet roll disposed over said member, the backing sheet being extended downwardly and between the die and plate, means for moving the backing sheet between said die and plate, and a substantially vertical guard plate engaging said backing sheet to force the same toward the plate carrying member.

2. A machine of the class described comprising a support for material to be operated upon, a die carrying member, a plurality of different cutting dies on the member, said member being movable to selectively aline any one of said dies into operative position with respect to said support, means for holding the die carrying member in selected positions, a die engaging member intermittently movable into engagement with the selected cutting die, and means for intermittently moving the die engaging member, said means being inoperative when none of said dies are in alinement with said support.

3. A machine of the class described comprising a support for material to be operated upon, a die carrying member, a plurality of different cutting dies on the member, said member being movable to selectively aline any one of said dies into operative position with respect to said support, means for holding the die carrying member in selected positions, a plate carrying member intermittently movable toward the dies, a plurality of die engaging plates on the last mentioned member, one being adapted to coöperate with each of said cutting dies when alined therewith, said member being movable to procure such coöperation, means for holding the plate carrying member in selected positions, and means for intermittently moving the plate carrying member, said means being inoperative when any of the cutting dies or die engaging plates are out of alinement with said support.

4. A machine of the class described comprising a support for material to be operated upon, a die carrying member, a plurality of different cutting dies on the member, said member being movable to selectively aline any one of said dies into operative position with respect to said support, means for holding the die carrying member in selected positions, a lever having a die engaging member on one end, a shaft, a connection between said lever and shaft whereby to rock the latter toward and away from the cutting dies during each revolution of the former, a constantly rotating pulley revoluble on said shaft, a clutch for connecting the pulley and shaft, means for disengaging the clutch on each revolution of said shaft, and means for releasing the last mentioned means, said releasing means being inoperative when none of said dies is in alinement with said support.

5. A machine of the class described including a backing member for material to be operated upon, a die carrying member, a plurality of different cutting dies on the member, said member being movable to selectively move any one of said dies into operative position with respect to the backing member, means for procuring relative movement between said backing member and die carrying member, and means for preventing operation of said first means when none of the cutting dies are in operative position with respect to the backing member.

6. A machine of the class described including a rotative backing member having a plurality of die engaging surfaces, a rotative die carrying member, a plurality of different cutting dies on said die carrying member adapted to engage corresponding backing surfaces, means for procuring punching movement of one of said rotative members toward the other and means preventing such movement when none of the dies and backing surfaces are in opposition.

7. A machine of the class described including a rotative backing member having a plurality of die backing surfaces, a rotative die carrying member, a plurality of different cutting dies on said die carrying member adapted to engage corresponding backing surfaces, means for procuring punching movement of one of said rotative members toward the other, notched flanges carried by said rotative members, pawls engageable in the notches of said flanges to prevent rotation of the members, and means controlled by said pawls for preventing operation of said first named means when the pawls are disengaged from the notches.

8. A machine of the class described including a rotative backing member having a plurality of die backing surfaces, a rotative die carrying member, a plurality of different cutting dies on said die carrying member adapted to engage corresponding backing surfaces, means for procuring punching movement of one of said rotative members toward the other, notched flanges carried by said rotative member, pawls engageable in the notches of said flanges to prevent rotation of the members, a lever, a connection between said lever and the pawls for retracting said pawls from the notches upon movement of the lever, and means operable by movement of the lever for preventing operation of said means for moving one of the rotative members.

9. A machine of the class described including a rotative backing member having a plurality of die backing surfaces, a rotative die carrying member, a plurality of different cutting dies on said die carrying member adapted to engage corresponding backing surfaces, notched flanges carried by said rotative member, pawls engageable in the notches of said flanges to prevent rotation of the members, a lever, a connection between said lever and the pawls for retracting said pawls from the notches upon movement of the lever, means for procuring movement of one of said rotative members toward the other including a continuously driven member, and a clutch connection with the said rotative member, and means carried by the lever for preventing operation of said clutch when the pawls are disengaged from their recesses.

10. A machine of the class described including a rotative backing member having a plurality of die backing surfaces, a rotative die carrying member, a plurality of different cutting dies on said die carrying member adapted to engage corresponding backing surfaces, means for procuring punching movement of one of said rotative members toward the other, notched flanges carried by said rotative members, pawls engageable in the notches of said flanges to prevent rotation of the members, a lever, a connection between said lever and the pawls for retracting said pawls from the notches upon movement of the lever, a hood positioned adjacent the die carrying member and movable away from said member, and a connection between said hood and the lever for moving said hood toward and away from said die carrying member upon movement of the lever.

11. A machine of the class described including a backing member, a rotatable die carrying member, a plurality of different cutting dies on the member, said member being rotatable to selectively move any one of said dies into operative position with respect to said backing member, a hood positioned adjacent said die carrying member and forming a support for work material inserted between the die carrying member and backing member, said hood being movable away from the die carrying member to permit rotation thereof.

12. A machine of the class described including a backing member, a rotatable die carrying member, a plurality of different cutting dies on the die carrying member, said member being rotatable to selectively move any one of said dies into operative position with respect to said backing member, a hood positioned adjacent said die carrying member and forming a support for work material inserted between the die carrying member and backing member, said hood being movable away from the die carrying member to permit rotation thereof, and a guard plate carried by the hood and spaced therefrom to permit insertion of work material between the guard plate and hood.

13. A machine of the class described including a backing member, a rotatable die carrying member, a plurality of different cutting dies on the die carrying member, said member being rotatable to selectively move any one of said dies into operative position with respect to said backing member, a hood positioned adjacent said die carrying member and forming a support for work material inserted between the die carrying member and backing member, said hood being movable away from the die carrying member to permit rotation thereof, and a guard plate carried by the hood and spaced therefrom to permit insertion of work material between the guard plate and hood, said guard plate having pivotal connection with the hood, and means for preventing pivotal movement of the guard plate with respect to the hood.

14. A machine of the class described including a backing member, a rotatable die carrying member, provided with a longitudinal passageway therethrough, a plurality of different cutting dies on the die carrying members adapted upon rotation of the member to selectively move into operative position with respect to said backing member, means for moving the backing member toward the die carrying member, and a conveyer in said passageway of the rotatable die carrying member.

15. A machine of the class described including a cutting die, a die backing member for engagement with the cutting die, means for intermittently procuring engagement of the die and backing members, a pair of backing sheet rolls, a feed mechanism for one of said rolls having yieldable connection with the roll for winding the backing sheet thereon, and a positive feeding mechanism for the backing sheet adapted to move the backing sheet past the die backing member a predetermined distance incidental to each engagement of the die and backing member.

16. A machine of the class described including a backing sheet roller provided with a longitudinal groove in its periphery, a shell engageable on the roller and longitudinally split, an inturned flange at one longitudinal edge of said shell engageable in the groove of the roller and adapted to engage the other longitudinal edge of the shell to hold the shell contracted, and outwardly extending spurs on the other longitudinal edge of the shell.

17. A machine of the class described including a main frame, a cutting die carried thereby, a pivoted lever, a die backing member carried by said lever, a cam shaft journaled in the frame, an eccentric member journaled on the lever, an arm mounted on said eccentric member and engaging the cam shaft, and means for adjusting said eccentric member with respect to the lever to vary the pressure of the die engaging plate upon rotation of the cam shaft.

In testimony that I claim the foregoing I have hereunto set my hand at Milwaukee, in the county of Milwaukee, and State of Wisconsin.

ROBERT SCHWALBACH.